(12) United States Patent
Gupta et al.

(10) Patent No.: US 10,476,824 B2
(45) Date of Patent: Nov. 12, 2019

(54) MANAGING UNPROFESSIONAL MEDIA CONTENT

(71) Applicant: Microsoft Technology Licensing, LLC, Redmond, WA (US)

(72) Inventors: Rupesh Gupta, Sunnyvale, CA (US); Mahdiehsadat Mirian Hosseinabadi, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 507 days.

(21) Appl. No.: 14/814,563

(22) Filed: Jul. 31, 2015

(65) Prior Publication Data

US 2017/0034090 A1   Feb. 2, 2017

(51) Int. Cl.
*H04L 12/58* (2006.01)

(52) U.S. Cl.
CPC ............. *H04L 51/12* (2013.01); *H04L 51/32* (2013.01)

(58) Field of Classification Search
CPC ....................................... H04L 51/12
USPC ......................................... 709/224
See application file for complete search history.

(56) References Cited

U.S. PATENT DOCUMENTS

| | | | |
|---|---|---|---|
| 2013/0097282 A1* | 4/2013 | Svendsen | G11B 27/00 709/217 |
| 2013/0124644 A1* | 5/2013 | Hunt | H04L 51/12 709/206 |
| 2014/0089067 A1* | 3/2014 | Filev | G06Q 30/0207 705/14.19 |
| 2015/0120583 A1* | 4/2015 | Zarrella | G06Q 50/01 705/317 |
| 2015/0234887 A1* | 8/2015 | Greene | G06F 17/241 707/736 |

* cited by examiner

*Primary Examiner* — Emmanuel L Moise
*Assistant Examiner* — Zia Khurshid
(74) *Attorney, Agent, or Firm* — Schwegman Lundberg & Woessner, P.A.

(57) ABSTRACT

Systems and methods for storing less than a threshold number of media content activity levels for media content objects at an online social networking service, identifying, using the stored media content activities, a threshold number of media content objects associated with a higher number of the media content activities occurring over a recent threshold period of time, receiving an indicator indicating that one of the identified media content objects is unprofessional, and propagating the indicator to each activity that includes the unprofessional media content object.

20 Claims, 9 Drawing Sheets

MANAGING UNPROFESSIONAL MEDIA CONTENT

TECHNICAL FIELD

The subject matter disclosed herein generally relates to data processing and more particularly, to managing unprofessional media content.

BACKGROUND

Providers and administrators of an online social networking service manage media content in a variety of different ways. Members of the online social networking service submit media content for inclusion in the online social networking service. In certain examples, determining whether the media content is relevant to the online social networking service can be difficult.

In some examples, submitted media content may be inappropriate for a professional online social networking service. A system may analyze all media content submission to the online social networking service, but such an approach for a large service would likely be prohibitive considering computing resources needed to perform the analysis. In another example, a system may track activities for a media content object, however, the nature of the activities does not typically indicate whether the media content object is unprofessional or not.

BRIEF DESCRIPTION OF THE DRAWINGS

Some embodiments are illustrated by way of example and not limitation in the figures of the accompanying drawings.

DETAILED DESCRIPTION

Figure 1:
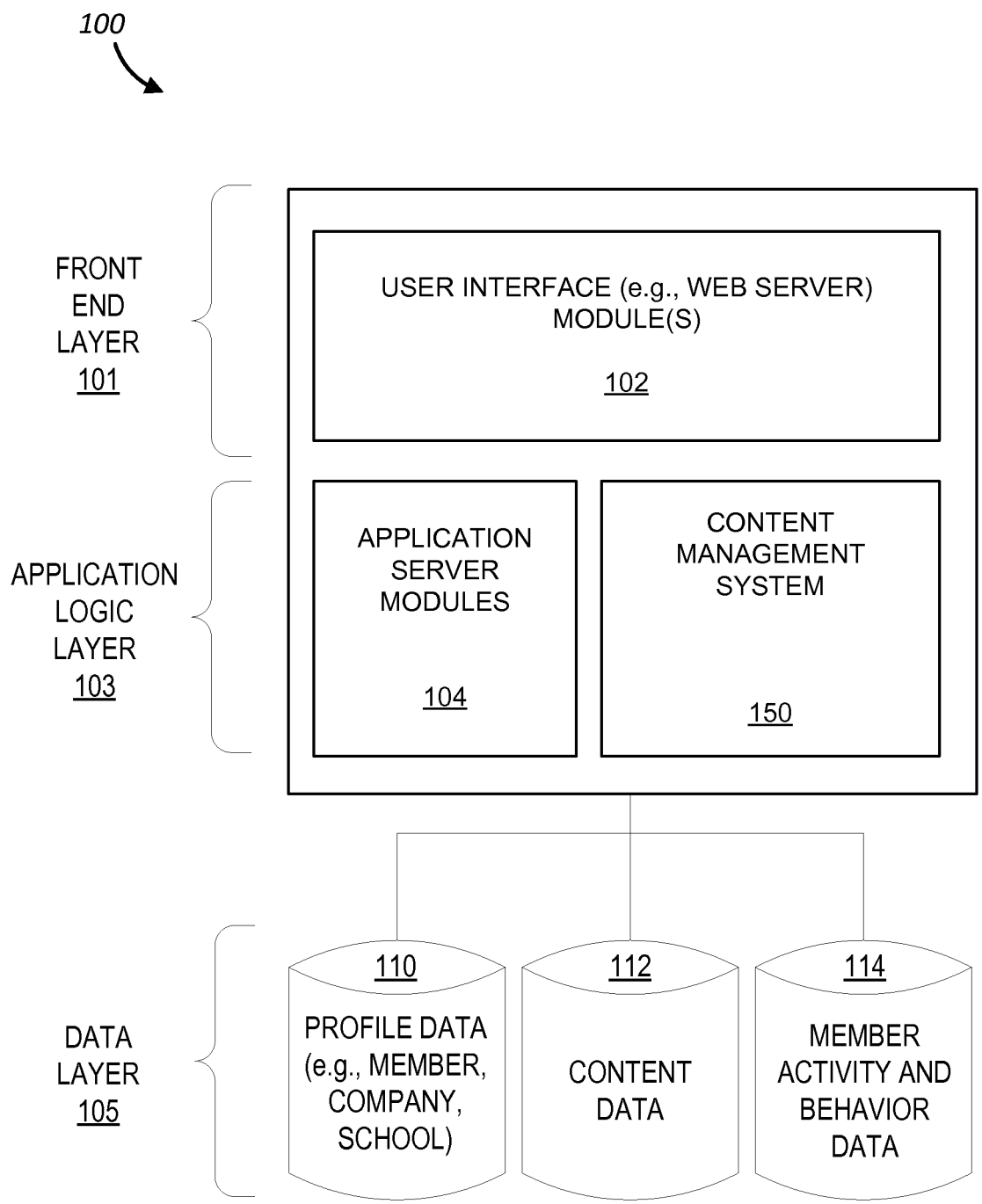
FIG. 1 is a block diagram illustrating various components or functional modules of an online social networking service, in an example embodiment.

The description that follows includes systems, methods, techniques, instruction sequences, and computing machine program products that embody illustrative embodiments of the invention described in the present disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Example methods and systems are directed to managing distribution of media content. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In one example embodiment, a system is configured to monitor activities at the online social networking service. The activities include a member of the online social networking service, an action, and a content media object. In one example, an activity includes a member posting a media content object to the online social networking service. In response, other members may view, forward, comment, like, dislike, hide, complain, or perform any other action on the posting activity. These activities are associated with the media content object because the media content object is included in the activity. In one example embodiment, the system aggregates activities that are associated with the media content object.

In another example embodiment, the system identifies a threshold number of media content objects associated with a highest number of activities. For example, where a member submits a media content object and many other members perform activities on the submission activity, the activities are associated with the media content object. In response to the media content object being associated with more activities than other media content objects, the system identifies the media content object as a candidate. Candidate media content objects may be removed, flagged, or otherwise identified allowing the system to manage the media content object in any other way.

In one example, the media content object is liked more times than other objects. In another example, the media content object is forwarded more times than other objects. In certain embodiments, media content includes, but is not limited to, text, images, audio, video, or other media content as one skilled in the art may appreciate.

The system may then transmit the media content objects that are associated with the most number of activities for analysis. In one example, the system presents the media content objects to an administrator for the system and receives an indicator from the administrator whether the media content objects are unprofessional or not. In another example, the system sends the media content objects to a remote learning machine for classification. In one example, a machine learning system is trained on a set of indicators so that it is capable of determining whether a media content object is unprofessional or not.

In one example embodiment, the system then receives an indicator that indicates the media content object is unprofessional and in response propagates the indicator to all activities that are associated the unprofessional media content. For example, in response to receiving an indicator that a media content object is unprofessional, the system determines all activities that include the media content object and flags them. In one embodiment, the flagged media content objects are removed. In another embodiment, the flagged media content objects are assigned a lower priority than other media content objects. In this way, the system may more quickly manage unprofessional media content from the online social networking service in response to determining that the media content object is unprofessional.

In one example embodiment, in response to a query that results in one or more media content objects are have been identified as unprofessional, the system may present the unprofessional media content objects after displaying the professional media content objects. In another example embodiment, the unprofessional media content objects and all activities associated with the unprofessional media content objects are removed from the online social networking service. In certain embodiments, unprofessional media content includes irrelevant content, bad content, morally objectionable content, unintelligent content, a puzzle, obscene content, or other content undesired by a professional.

FIG. 1 is a block diagram illustrating various components or functional modules of an online social networking service 100, consistent with some examples. The online social networking service 100 may be utilized by users to perform activities on submitted media content objects. In one example, the online social networking service 100 includes the content management system 150 that performs the various media content identification and removal operations described herein.

A front end 101 consists of a user interface module (e.g., a web server) 102, which receives requests from various client-computing devices, and communicates appropriate responses to the requesting client devices. For example, the user interface module(s) 102 may receive requests in the form of Hypertext Transport Protocol (HTTP) requests, or other web-based, application programming interface (API) requests. In another example, the front end layer 101 receives requests from an application executing via a member's mobile computing device. In one example, a member submits media content for inclusion in the online social networking service 100, or requests media content from the online social networking service 100.

An application logic layer 103 includes various application server modules 104, which, in conjunction with the user interface module(s) 102, may generate various user interfaces (e.g., web pages, applications, etc.) with data retrieved from various data sources in a data layer 105.

In some examples, individual application server modules 104 may be used to implement the functionality associated with various services and features of the online social networking service 100. For instance, the ability of an organization to establish a presence in the social graph of the online social networking service 100, including the ability to establish a customized web page on behalf of an organization, and to publish messages or status updates on behalf of an organization, may be services implemented in independent application server modules 104. Similarly, a variety of other applications or services that are made available to members of the online social networking service may be embodied in their own application server modules 104. Alternatively, various applications may be embodied in a single application server module 104.

In some examples, the online social networking service 100 includes the content management system 150, such as may be utilized to receive media content, identify media content objects associated with more activities, receive an indicator that the media content is unprofessional, and propagate the indicator to other activities that are associated with the unprofessional media content.

As illustrated, the data layer 105 includes, but is not necessarily limited to, several databases 110, 112, 114, such as a database 110 for storing profile data, including both member profile data as well as profile data for various organizations. Consistent with some examples, when a person initially registers to become a member of the online social networking service 100, the person may be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database 110. Similarly, when a representative of an organization initially registers the organization with the online social networking service 100, the representative may be prompted to provide certain information about the organization. This information may be stored, for example, in the database 110, or another database (not shown). With some examples, the profile data may be processed (e.g., in the background or offline) to generate various derived profile data. For example, if a member has provided information about various job titles the member has held with the same or different companies, and for how long, this information can be used to infer or derive a member profile attribute indicating the member's overall seniority level, or seniority level within a particular company. With some examples, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the online social networking service. A "connection" may require a bi-lateral agreement by the members, such that both members acknowledge the establishment of the connection. Similarly, with some examples, a member may elect to "follow" another member. In contrast to establishing a connection, the concept of "following" another member typically is a unilateral operation, and at least with some examples, does not require acknowledgement or approval by the member that is being followed. When one member follows another, the member who is following may receive status updates or other messages published by the member being followed, or relating to various activities undertaken by the member being followed. Similarly, when a member follows an organization, the member becomes eligible to receive messages or status updates published on behalf of the organization. For instance, messages or status updates published on behalf of an organization that a member is following will appear in the member's personalized data feed or content stream. In any case, the various associations and relationships that the members establish with other members, or with other entities and objects, are stored and maintained within a social graph database.

The online social networking service 100 may provide a broad range of other applications and services that allow members the opportunity to share and receive information, often customized to the interests of the member. For example, with some examples, the online social networking service 100 may include a photo sharing application that allows members to upload and share photos with other members. With some examples, members may be able to self-organize into groups, or interest groups, organized around a subject matter or topic of interest. With some examples, the online social networking service 100 may host various job listings providing details of job openings with various organizations. In other embodiments, the content management system 150 stores received media content in a media content storage database 112.

As members interact with the various applications, services and content made available via the online social networking service 100, information concerning content items interacted with, such as by viewing, playing, forwarding, liking, disliking, hiding, reporting, and the like, etc., may be monitored and information concerning the interaction may be stored, for example, as indicated in FIG. 1 by the database 114. The interactions with the online social networking service 100 may be stored as activities. Thus, previous interactions with a media content item by various members of the online social networking service 100 may be stored and utilized in determining, among other factors, how various types of content items, such as organic content items and sponsored content items, result in differences in engagement levels with the content items by members of the online social networking service 100.

Although not shown, with some examples, the online social networking service 100 provides an application programming interface (API) module via which third-party applications can access various services and data provided by the online social networking service 100. For example, using an API, a third-party application may provide a user interface and logic that enables the member to submit a media content object, or perform any other activities on a media content object. Such third-party applications may be browser-based applications, or may be operating system-specific. In particular, some third-party applications may reside and execute on one or more mobile devices (e.g., phone, or tablet computing devices) having a mobile operating system.

Figure 2:
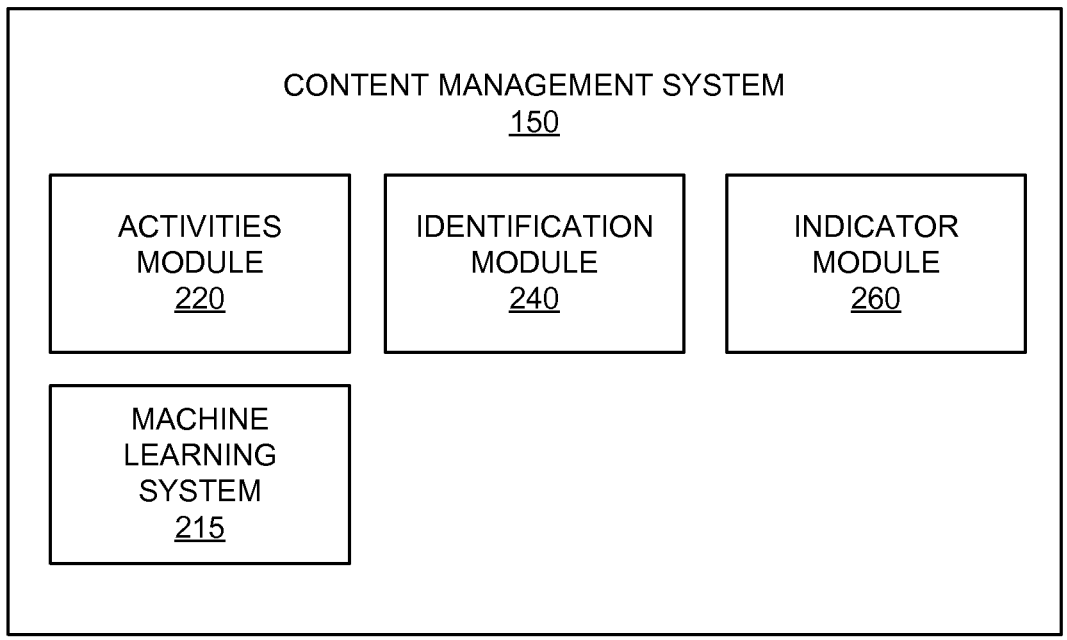
FIG. 2 is a schematic block diagram illustrating components of a content management system, according to one example embodiment.

FIG. 2 is a schematic block diagram illustrating components of a content management system, according to one example embodiment. In one example embodiment, the content management system 150 includes an activities module 220, an identification module 240, an indicator module 260, and a machine learning system 215.

In one example embodiment, the activities module 220 stores up to two levels of media content activities at an online social networking service. Activities include each event where a member of the online social networking service performs some action on a media content object. Therefore, an activity includes a member, an action, and a media content object. For example, where a member likes a media content object, the activity includes the member, the "like" action, and the media content object. In a specific example, a member may comment on an image submitted by another member.

In another example embodiment, the activities module 220 limits activity storage to a threshold number of levels. In one specific example, the activities module 220 limits the number of level to two. For example, in a hierarchy of activities associated with a media content object, members perform many actions on the activity that includes submitting the media content object. These actions include the first level of activities. The second level of activities includes members that perform actions on activities that are included in the first level of activities. According to this example embodiment, the activities module 220 does not monitor or store activities beyond the second level. In this way, the activities module 220 is not overwhelmed by an exponential growth in activities for popular media content objects. Of course, in other embodiments, the threshold number of levels is three or more and this disclosure is not limited in this regard.

In one example, a first activity includes a member posting an image to the online social networking service. In response, the image is viewed by other members. For example, one member "likes" the image, another member forwards the image, and another member comments on the image. These three actions are included in a second level of activities associated with the image (the media content object) because these are actions are acting upon the initial activity of posting the image.

A third level of activities are activities that include actions on activities in the second level, etc. In this example, other members of the social networking service view the second level of activities associated with the posted media content object and perform additional actions on the second level of activities. For example, one member may dislike the member's "like" action, another member may comment on an the earlier members "forward" action, and yet another member may forward the earlier member's "comment" action. Because these activities include actions on the second level of activities, they are at a third level of activities associated with the media content object.

In one example embodiment, the identification module 240 identifies a threshold number of media content objects having a higher number of associated activities over a recent threshold period of time. In one example, the threshold period of time is one week and the threshold number of media content objects is 1,000. In this example, the identification module 240 sorts the media content objects according to the number of activities associated with the media content objects and selects the top 1,000 media content objects. In this way, the identification module 240 determines the 1,000 media content objects that are subjects of the highest number of activities over the past week. Of course, other time periods and other threshold number of media content objects may be used and this disclosure is not limited in this regard.

In another example embodiment, the identification module 240 transmits the threshold number of media content objects to an administrator of the online social networking service 100. In one example, the identification module 240 transmits the media content objects to the administrator by generating a user interface that displays the media content objects. In this way, the identification module 240 presents the media content objects to the administrator. In a specific example, the identification module 240 presents the media content object using the interface module 102. Therefore, the interface may include a graphical interface, an electronic interface, a virtual interface, an API, or any other interface as one skilled in the art may appreciate.

In one example embodiment, the interface allows the administrator to sort the threshold number of media content objects by a type of the action associated with the activities associated with the media content objects. For example, the interface may provide one or more selections allowing the administrator to view the media content objects with a highest number of likes, forwards, dislikes, hides, or any other action that a member of the online social networking service may perform on a media content object. Therefore, a media content object that is associated with the most number of "like" actions is presented before other media content objects in response to the administrator sorting the media content objects by the "like" action.

In another example embodiment, the identification module 240 transmits the threshold number of media content objects to a machine learning system 215 trained to recognize unprofessional content. As one skilled in the art may appreciate, a machine learning system 215 may be trained on a set of media content objects that have been identified as humor, puzzles, advertisements, or other unprofessional content as described herein.

In another example embodiment, the indicator module 260 receives an indicator indicating that one of the identified media content objects is unprofessional. The indicator may be received in any way as one skilled in the art may appreciate. In certain examples, the indicator is received over a network connection according to an API, via a graphical user interface, or any other means.

In one example embodiment, the indicator module 260 receives the indicator programmatically. For example, as an administrator for the online social networking service indicates unprofessional content via a user interface, the interface generates an indicator that the selected media content object is unprofessional.

In another example embodiment, the indicator module 260 receives the indicator from the machine learning system 215. In certain examples, the machine learning system 215 is a third party system and/or service. In one example, the indicator module 260 receives an indicator for each media content object transmitted to the machine learning system 215.

In one example embodiment, in response to receiving an indicator that a media content object is unprofessional, the indicator module 260 propagates the indicator to each activity that includes the media content object. In one example, a media content object is forwarded or liked 10,000 times. In response to the indicator module 260 receiving an indicator that the media content is unprofessional, the indicator module 260 propagates the indicator to each of the 10,000 activities. In another example embodiment, the indicator module 260 may remove each of the activities associated with the media content object. In this way, the media content object 260 may be removed from the online social networking service regardless of how many times members have performed activities associated with the media content object.

In another example embodiment, the indicator module 260 trains the machine learning system 215. For example, the indicator module 260 may assemble a large set of media content objects that have been pre-identified as unprofessional. The indicator module 260 may retrieve the media content objects from any source as one skilled in the art may appreciate. In one example embodiment, the indicator module 260 causes the machine learning system 215 to train on the set of media content objects. In response, the machine learning system 215 recognizes unprofessional media content. Therefore, the machine learning system 215 generates an indicator for each media content object and may indicate that each media content object is obscene, humorous, spam, a puzzle, an advertisement, or any other unprofessional media content. In one example, any content that is not professional in nature, may be identified as unprofessional.

In one example embodiment, the indicator module 260 removes the activities at the online social networking service that include the unprofessional media content. In one example, the indicator module 260 removes the original submission activity for the unprofessional media content and any and/or all activities associated with the media content object.

In one example, the media content and associated activities are deleted. In another example, the unprofessional media content objects are replaced with an image indicating removal of the media content object. In another example, the indicator module 260 assigns a lower priority value to the unprofessional media content. In other embodiments, the indicator module 260 classifies the unprofessional media content in order to perform any other actions on the unprofessional media content.

Figure 3:
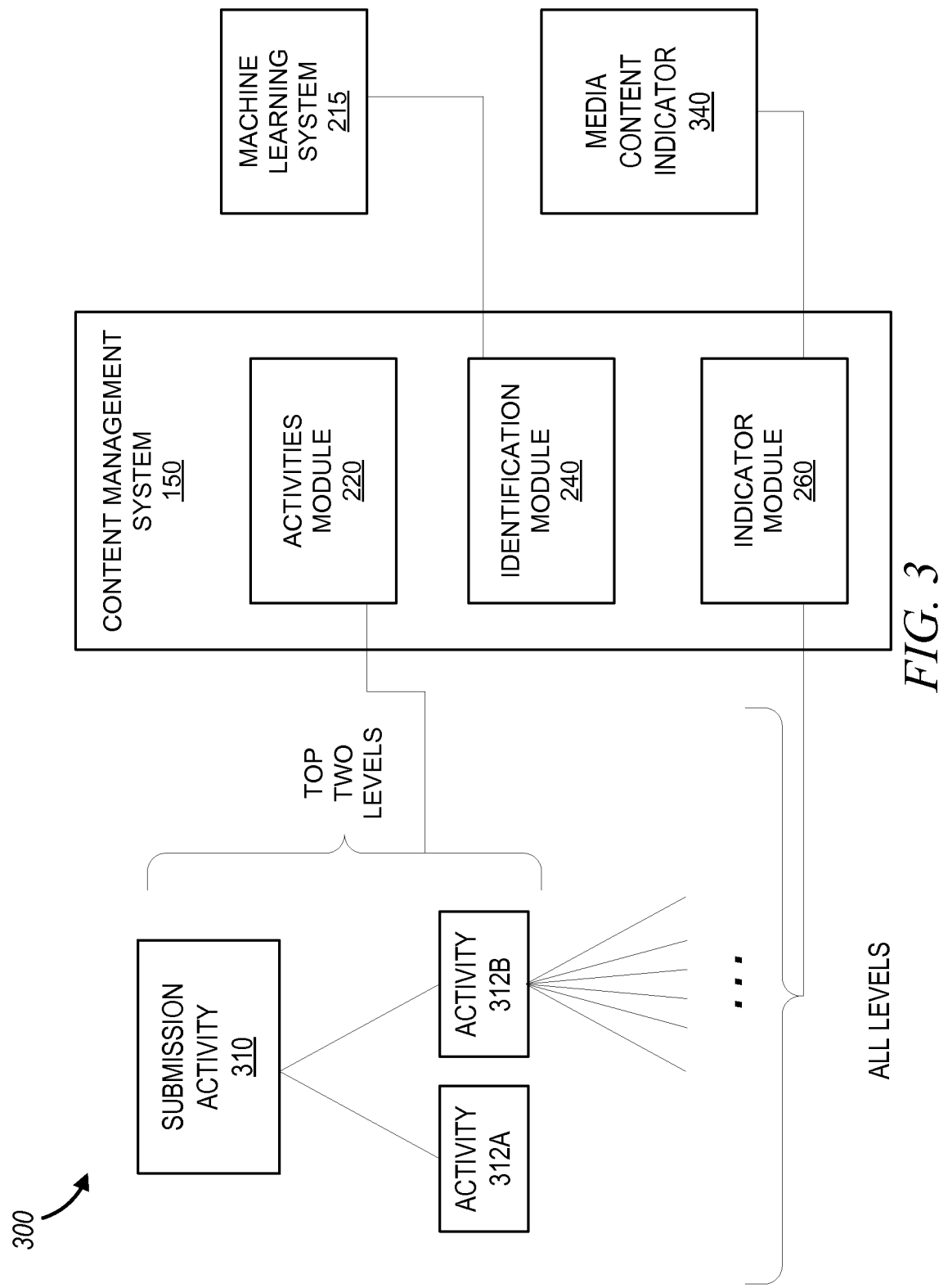
FIG. 3 is a schematic block diagram illustrating one scenario for a content management system, according to an example embodiment.

FIG. 3 is a schematic block diagram illustrating one scenario 300 for a content management system 150, according to an example embodiment. In one example embodiment, the media content object is received by the online social networking service 100 in a submission activity 310. In response a first set of members may perform one or more activities on the media content object 310. For example, a first activity 310A includes a first member commenting on the submission activity 310 and a second activity 310B includes a second member hiding the submission activity 310. Furthermore, many other members of the online social networking service may perform other actions at further levels resulting in thousands and/or millions of activities associated with the media content object.

In one example embodiment, the activities module 220 stores the submission activity 310 and the second level (e.g., the activities 312A and 312B). In one specific, non-limiting, example, a member names "Alfred" submits an image A. This submission activity includes (Alfred, submission, image A) and is a first level. In this example, another member named "Bruce" comments on the submission activity. This activity includes (Bruce, comment, submission activity) and is a second level of activities. In response to another member named "Carol" likes Bruce's comment, she generates another activity that includes (Carol, like, (Alfred, share, image A)). Such an approach helps to identify media content objects without being overwhelmed by exponential growth in activities in further levels.

In one example embodiment, the identification module 240 determines a threshold number of media content objects that resulted in a highest number of activities. In one example, the first two levels of activities for the media content object include 400 activities. In response to other media content objects at the online social networking service resulting in less than 400 activities and the threshold number of media content objects being more than one, the media content object 310 is included in the threshold number of media content objects.

In one example embodiment, the indicator module 260 receives an indicator 340 that indicates whether the media content object 310 is unprofessional. In one example, the indicator module 260 sends the media content object 310 to a machine learning system 215 and receives the indicator 340 from the machine learning system 215. In another example, the indicator module 260 displays the media content object 310 to an administrator of the online social networking service, and receives the indicator 340 from the administrator. For example, in response to the administrator selecting the indicator 340 via a graphical user interface.

Figure 4:
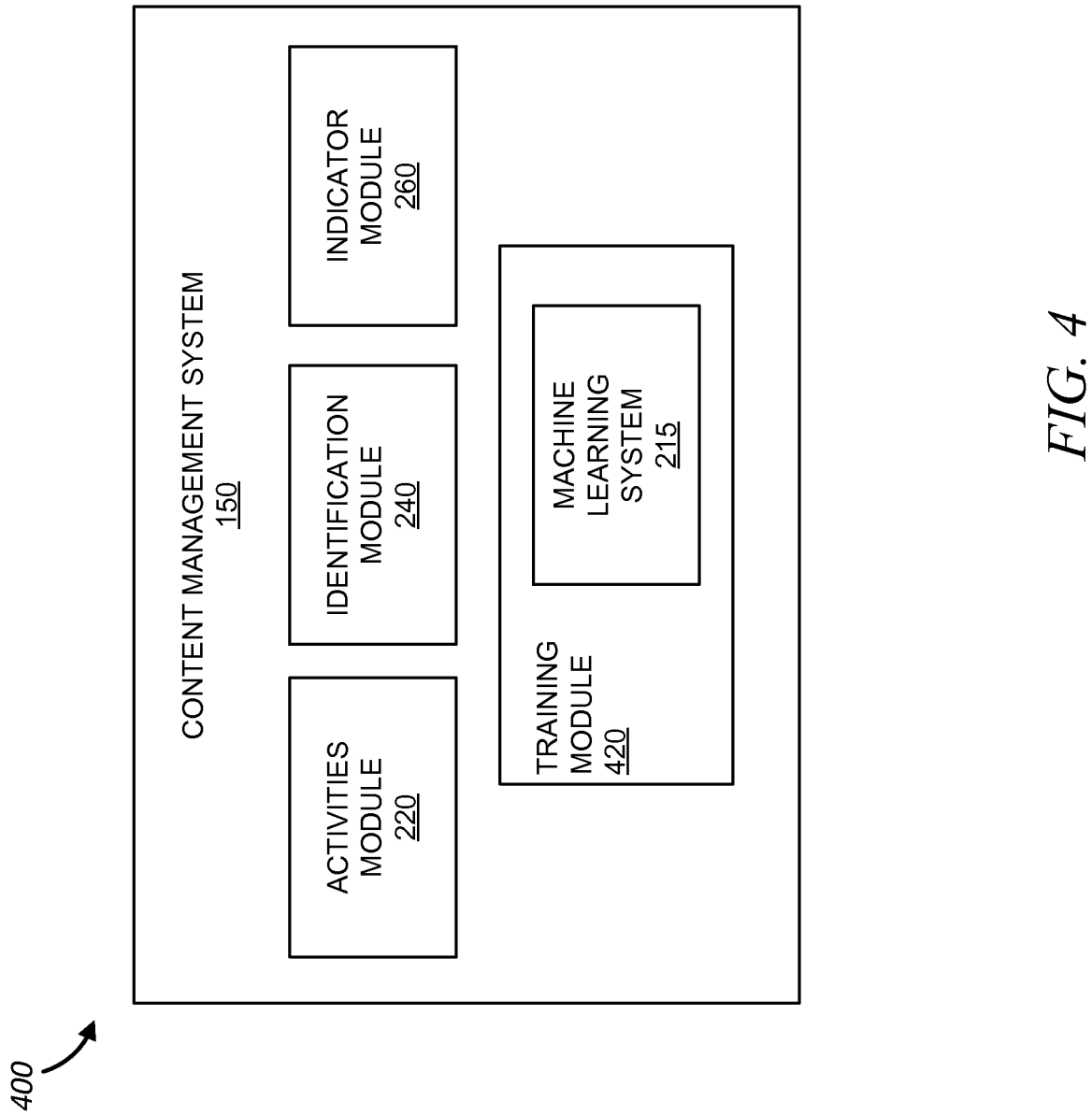
FIG. 4 is a schematic block diagram illustrating a content management system, according to one example embodiment.

FIG. 4 is a schematic block diagram illustrating a content management system, according to one example embodiment. In one example embodiment, the content management system 150 includes the activities module 220, the identification module 240, and the indicator module 260. The activities module 220, the identification module 240 and the indicator module 260 may or may not be substantially similar to those modules depicted in FIG. 2. In this example embodiment, the indicator module 260 includes the machine learning system 215 trained to recognize unprofessional media content objects.

Figure 5:
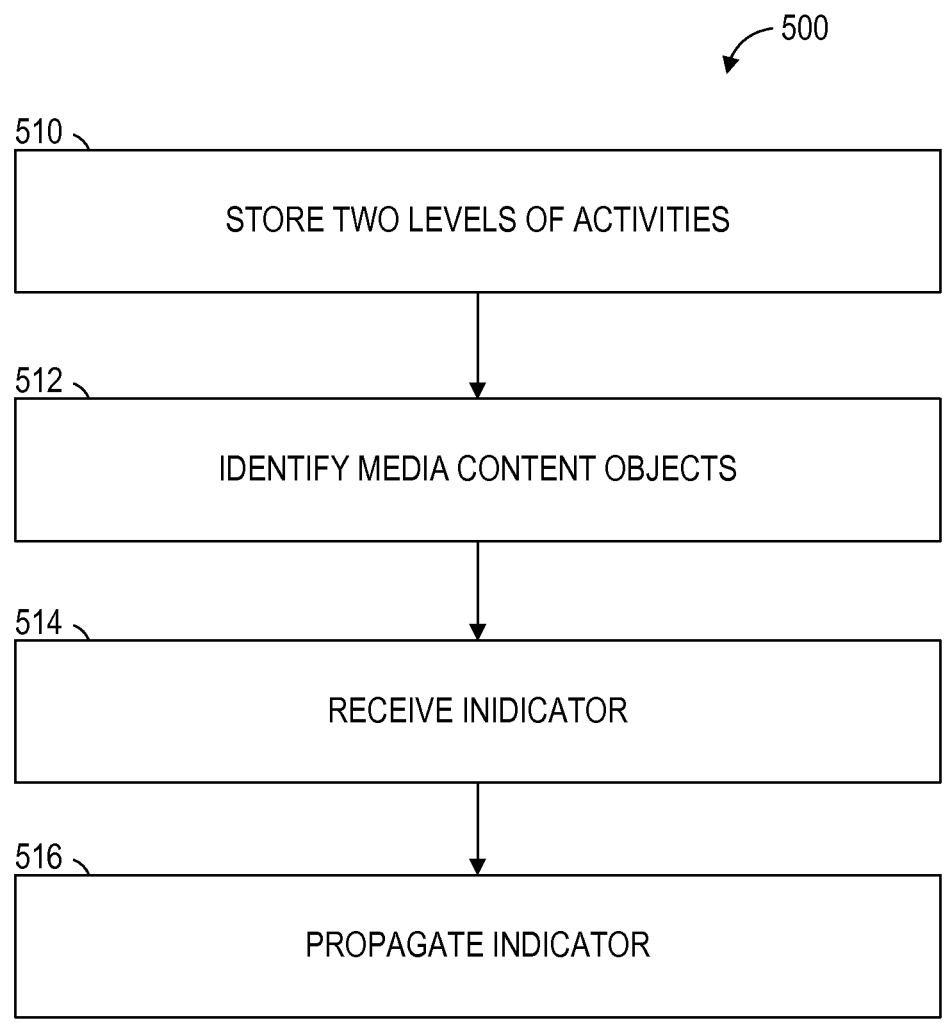
FIG. 5 is a flow chart diagram illustrating a method for managing unprofessional media content, according to one example embodiment.

FIG. 5 is a flow chart diagram illustrating a method 500 for identifying unprofessional media content, according to one example embodiment. According to one example embodiment, operations in the method 500 may be performed by the content management system 150, using modules described above with respect to FIG. 2. As shown in FIG. 5, the method 500 includes operations 410, 412, 414, and 416.

In one example embodiment, the method 500 begins and at operation 510, the activities module stores up to two levels of media content activities associated with a media content object. For example, as members of the online social networking service 100 perform activities on the media content object, the activities module 220 stores these activities.

The method 500 continues at operation 512 and the identification module 240 identifies a threshold number of media content objects associated with more activities than other media content objects at the online social networking service 100. In another embodiment, the identification module 240 identifies the media content objects resulting in higher activities over a recent period of time. In one example, the identification module 240 identifies a media content object associated with a highest number of activities over the past month. Of course, other time periods may be used and this disclosure is not limited in this regard.

The method 500 continues at operation 514 and the indicator module 260 receives an indicator indicating that a media content object is unprofessional. In one example, the indicator indicates that the media content object is a puzzle.

The method 500 continues at operation 516 and the indicator module 260 propagates the indicator to each activity that is associated with the unprofessional media content. In one example, hundreds of members of the online social networking service 100 commented on the unprofessional media content and the indicator module 260 applies the indicator to each of the activities that includes comments.

Figure 6:
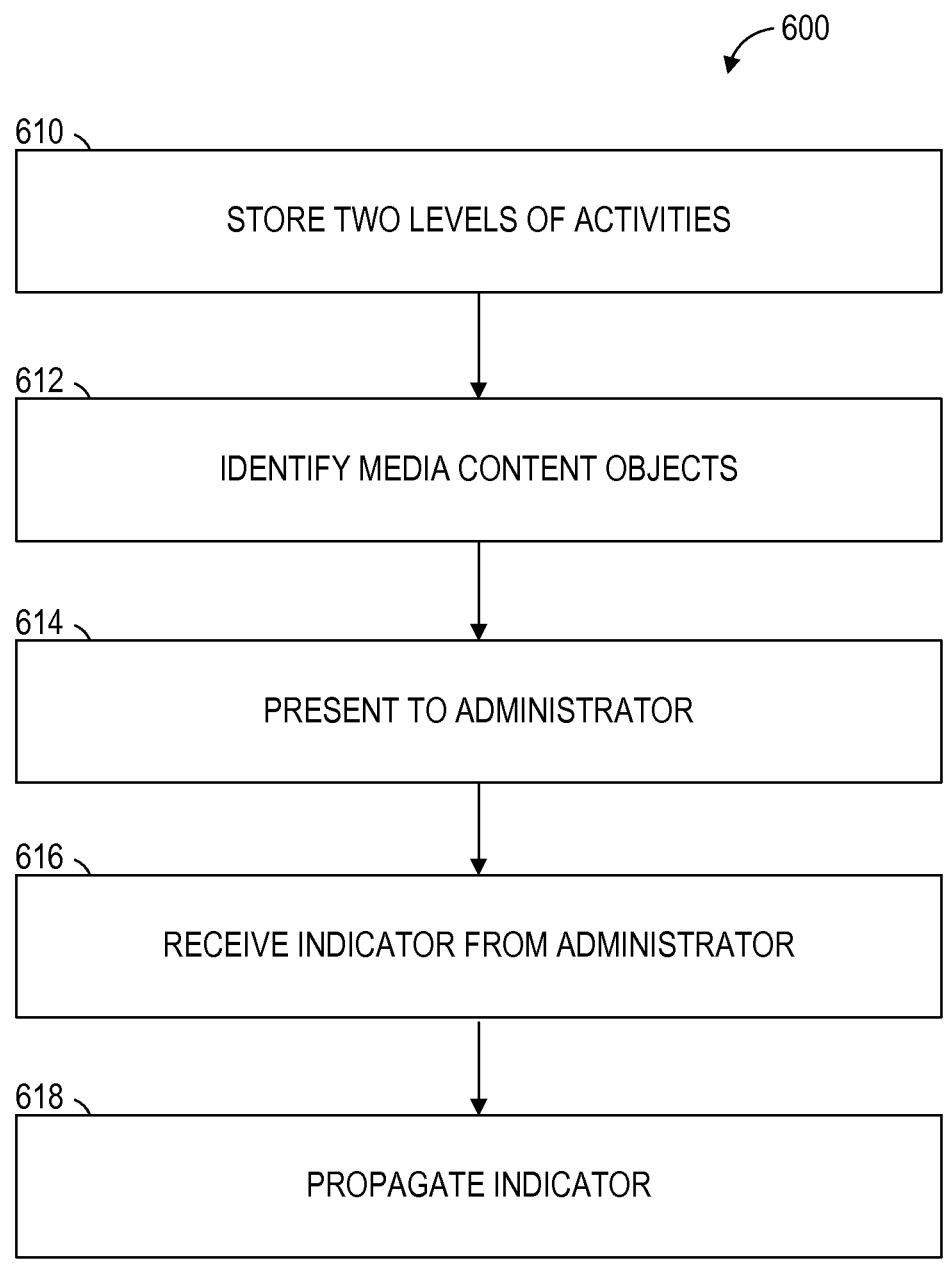
FIG. 6 is a flow chart diagram illustrating another method for managing unprofessional media content, according to an example embodiment.

FIG. 6 is a flow chart diagram illustrating another method 600 for identifying unprofessional media content, according to an example embodiment. According to one example embodiment, operations in the method 600 may be performed by the content management system 150, using modules described above with respect to FIG. 2. As shown in FIG. 6, the method 600 includes operations 610, 612, 614, 616, and 618.

In one example embodiment, the method 600 begins and at operation 610, the activities module stores up to three levels of media content activities for a media content object. For example, as members of the online social networking service 100 perform activities on the media content object, the activities module 220 stores these activities for the identification module 240. In one embodiment, the activities module 220 stores activities that include a member performing the activity, the action for the activity, and a media content object that is the subject of the activity.

The method 600 continues at operation 612 and the identification module 240 identifies a threshold number of media content objects resulting in more activities than other media content objects at the online social networking service. In another embodiment, the identification module 240 identifies the media content objects resulting in higher activities over a recent period of time. In one example, the identification module 240 identifies a media content object resulting in a highest number of activities over the past 12 hours. Of course, other time periods may be used and this disclosure is not limited in this regard.

The method 600 continues at operation 614 the identification module 240 presents one of the media content objects to an administrator of the online social networking service 100. For example, the identification module 240 may cause the media content object to be displayed via a graphical user interface.

The method 600 continues at operation 616 and the indicator module 260 receives an indicator indicating that a media content object is unprofessional. In one example, the indicator indicates that the media content object is an advertisement.

The method 600 continues at operation 616 and the indicator module 260 propagates the indicator to each activity that is associated with the advertisement. In one example, thousands of members of the online social networking service 100 hid the unprofessional media content and the indicator module 260 applies the indicator to of the hide activities.

Figure 7:
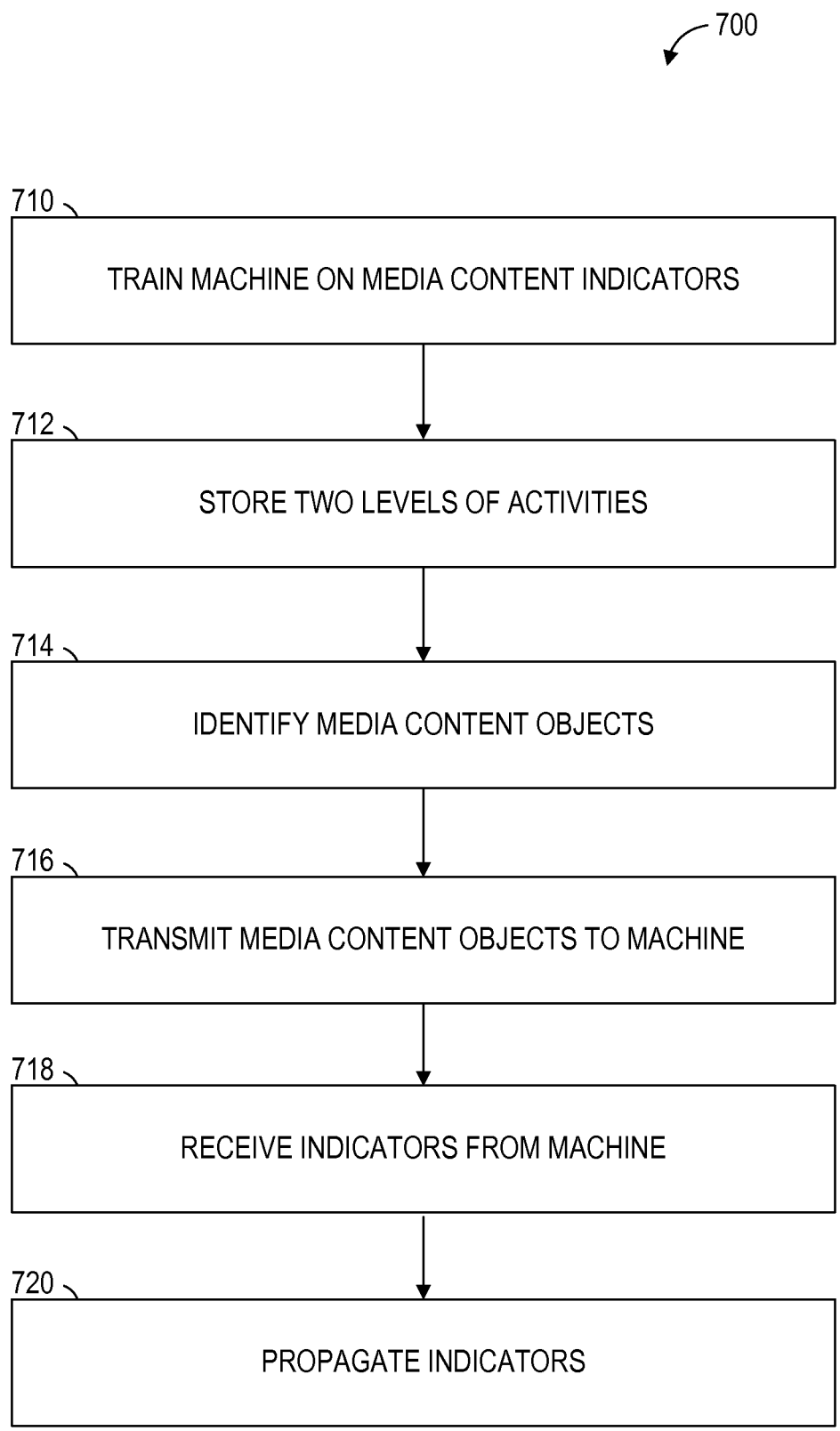
FIG. 7 is a flow chart diagram illustrating one method for managing unprofessional media content, according to one example embodiment.

FIG. 7 is a flow chart diagram illustrating one method 700 for identifying unprofessional media content, according to one example embodiment. According to one example embodiment, operations in the method 700 may be performed by the content management system 150, using modules described above with respect to FIG. 2. As shown in FIG. 7, the method 700 includes operations 710, 712, 714, 716, 718, and 720.

In one example embodiment, the method 700 begins and at operation 710, the activities module 220 trains the machine learning system 215 to recognize unprofessional media content. As one skilled in the art may appreciate, the machine 151 may be trained on existing media content objects and existing indicators. In another embodiment, the activities module 220 configures a neural network, or other machine capable of determining whether the media content is unprofessional.

The method 700 continues at operation 712 and the activities module stores up to two levels of media content activities for a media content object. For example, as members of the online social networking service perform activities on the media content object, the activities module 220 stores these activities for the identification module 240. The method 700 continues at operation 714 and the identification module 240 identifies a threshold number of media content objects resulting in more activities than other media content objects at the online social networking service 100.

The method 700 continues at operation 716 the identification module 240 transmits one of the identified media content objects to the machine learning system 215 for classification. In one example, the identification module 240 transmits the media content object to the machine learning system 215 by writing the media content to storage that is accessible by the machine learning system 215. In another example, the identification module 240 transmits the media content object to the machine learning system 215 using a network connection as one skilled in the art may appreciate.

The method 700 continues at operation 718 and the indicator module 260 receives an indicator from the machine learning system 215 indicating that the transmitted media content object is unprofessional. In one example, the indicator indicates that the media content object is humorous. The method 700 continues at operation 720 and the indicator module 260 propagates the indicator to each activity associated with the advertisement as described herein.

Figure 8:
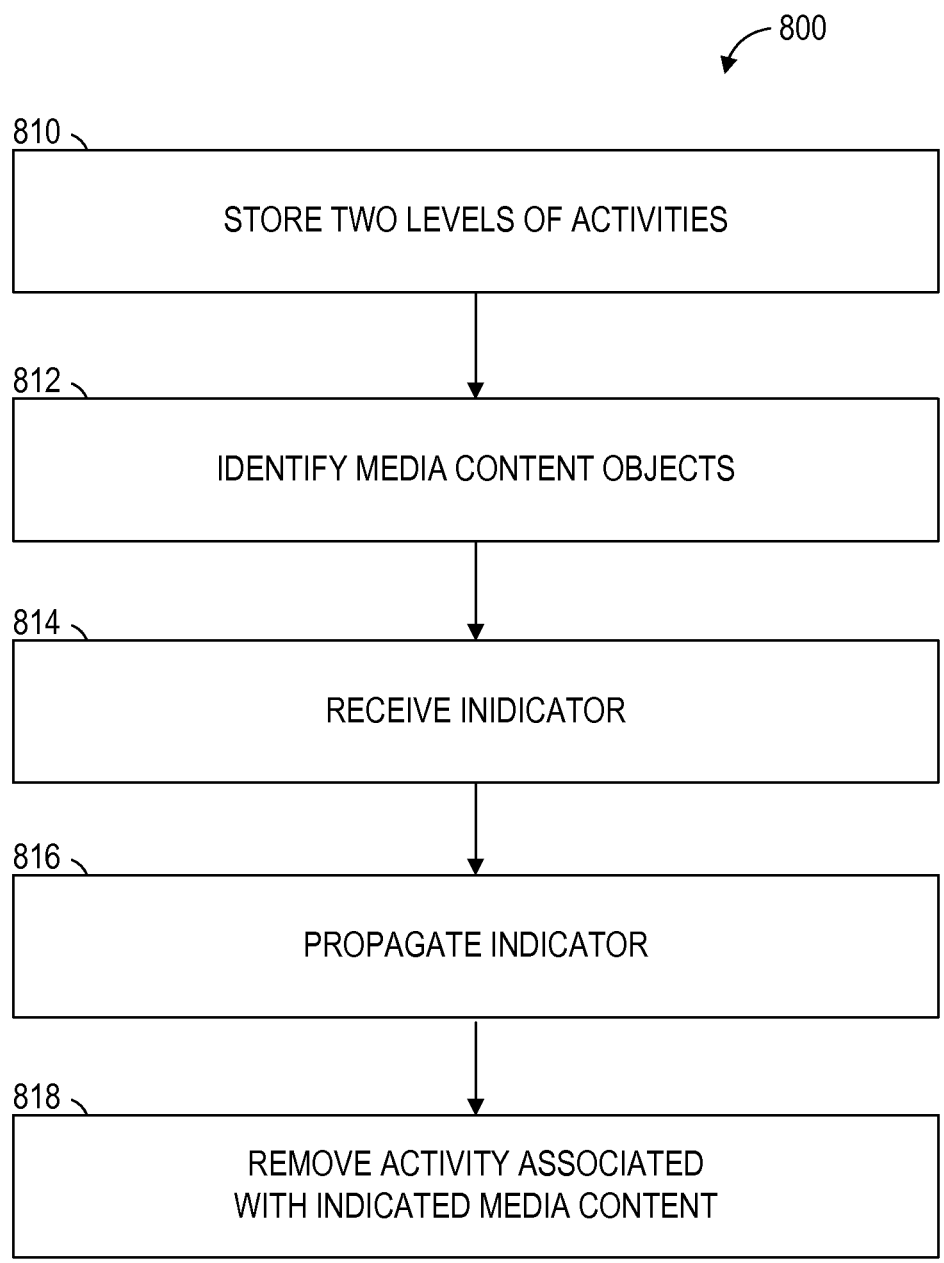
FIG. 8 is a flow chart diagram illustrating one method for managing unprofessional media content, according to an example embodiment.

FIG. 8 is a flow chart diagram illustrating one method 800 for managing unprofessional media content, according to an example embodiment. According to one example embodiment, operations in the method 800 may be performed by the content management system 150, using modules described above with respect to FIG. 2. As shown in FIG. 8, the method 800 includes operations 810, 812, 814, 816, and 818.

In one example embodiment, the method 800 begins and at operation 810, the activities module stores up to two levels of media content activities for a media content object. For example, as members of the online social networking service perform activities on the media content object, the activities module 220 stores these activities for the identification module 240.

The method 800 continues at operation 812 and the identification module 840 identifies a threshold number of media content objects resulting in more activities than other media content objects at the online social networking service. In another embodiment, the identification module 240 identifies the media content objects resulting in higher activities over a recent period of time. In one example, the identification module 240 identifies a media content object resulting in a highest number of activities over the past month. Of course, other time periods may be used and this disclosure is not limited in this regard.

The method 800 continues at operation 814 and the indicator module 260 receives an indicator indicating that a media content object is unprofessional. In one example, the indicator indicates that the media content object is a puzzle.

The method 800 continues at operation 816 and the indicator module 260 propagates the indicator to each activity associated with the unprofessional media content. In one example, hundreds of members of the online social networking service 100 commented on the unprofessional media content and the indicator module 260 applies the indicator to each of the activities that include the comment actions.

The method 800 continues at operation 818 and the indicator module 260 removes activities associated with the unprofessional media content object. In one example, the indicator module 260 inspects activities and determines each activity that includes the media content object. In one example, the indicator module 260 deletes activities at the online social networking service 100 that include the unprofessional media content. In this example, comments on the unprofessional media content object are deleted, forwards of the media content object are deleted, likes are deleted, and any other activities including the unprofessional media content are removed from the online social networking service.

Figure 9:
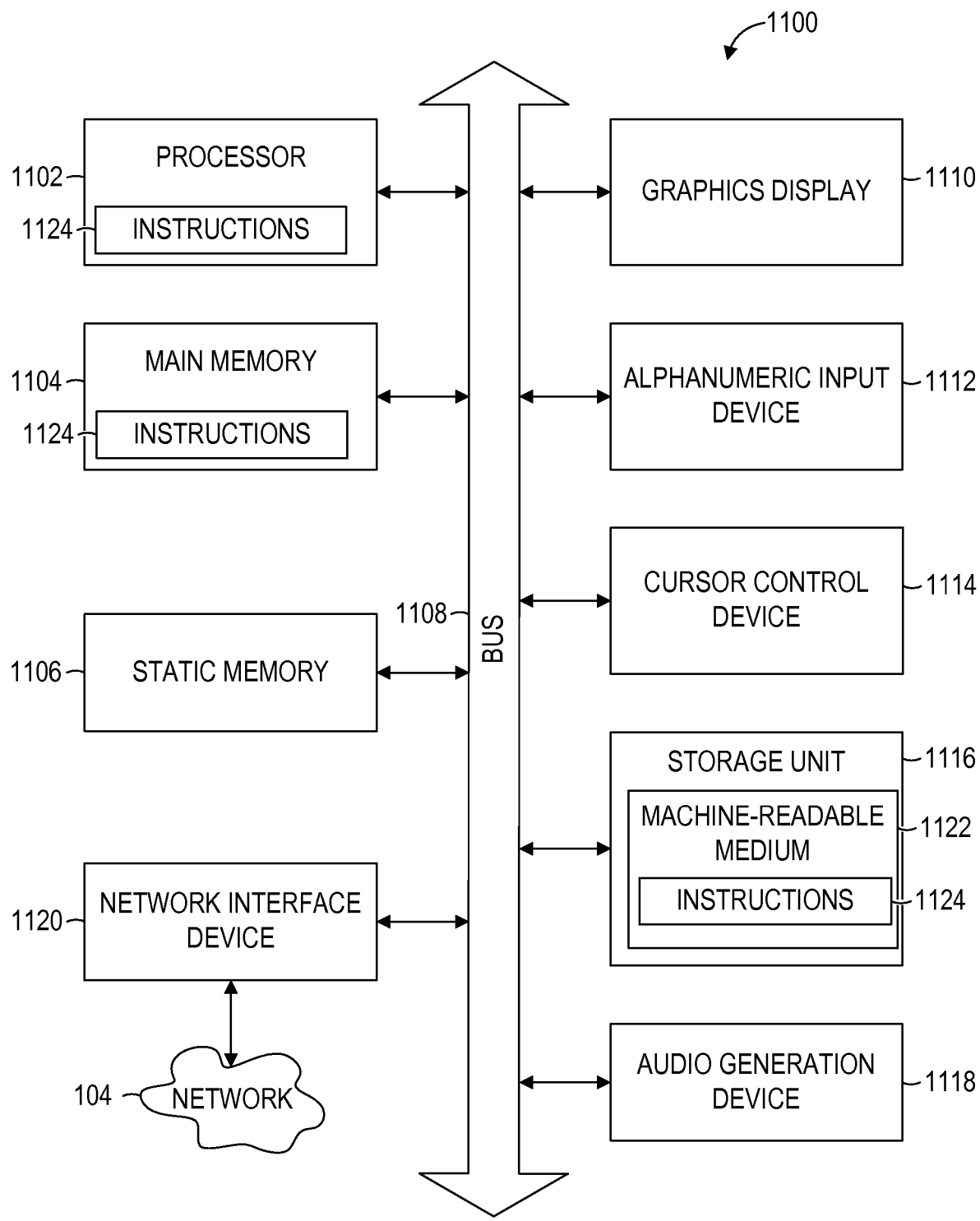
FIG. 9 is a block diagram illustrating components of a machine able to read instructions from a machine-readable medium.

FIG. 9 is a block diagram illustrating components of a machine able to read instructions from a machine-readable medium. Specifically, FIG. 9 shows a diagrammatic representation of the machine 1100 in the example form of a computer system and within which instructions 1124 (e.g., software) for causing the machine 1100 to perform any one or more of the methodologies discussed herein may be executed. In alternative embodiments, the machine 1100 operates as a standalone device or may be connected (e.g., networked) to other machines. In a networked deployment, the machine 1100 may operate in the capacity of a server machine or a client machine in a server-client network environment, or as a peer machine in a peer-to-peer (or distributed) network environment. The machine 1100 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1124, sequentially or otherwise, that specify actions to be taken by that machine. Further, while only a single machine is illustrated, the term "machine" shall also be taken to include a collection of machines that individually or jointly execute the instructions 1124 to perform any one or more of the methodologies discussed herein. In certain embodiments, the various modules described in FIG. 2 are implemented as part of the instructions 1124. In another example embodiment, the machine 151 trained to recognize unprofessional media content is implemented as a collection of machines.

The machine 1100 includes a processor 1102 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1104, and a static memory 1106, which are configured to communicate with each other via a bus 1108. The machine 1100 may further include a graphics display 1110 (e.g., a plasma display panel (PDP), a light emitting diode (LED) display, a liquid crystal display (LCD), a projector, or a cathode ray tube (CRT)). The machine 1100 may also include an alphanumeric input device 1112 (e.g., a keyboard), a cursor control device 1114 (e.g., a mouse, a touchpad, a trackball, a joystick, a motion sensor, or other pointing instrument), a storage unit 1116, a signal generation device 1118 (e.g., a speaker), and a network interface device 1120.

The storage unit 1116 includes a machine-readable medium 1122 on which is stored the instructions 1124 (e.g., software) embodying any one or more of the methodologies or functions described herein. The instructions 1124 may also reside, completely or at least partially, within the main memory 1104, within the processor 1102 (e.g., within the processor's cache memory), or both, during execution thereof by the machine 1100. Accordingly, the main memory 1104 and the processor 1102 may be considered as machine-readable media. The instructions 1124 may be transmitted or received over a network 104 via the network interface device 1120. In another example embodiment, one or more of the modules are implemented as a middleware, library code, or as part of an operating system for the machine 1100.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1122 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine (e.g., machine 1100), such that the instructions, when executed by one or more processors of the machine (e.g., processor 1102), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, nonvolatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A system comprising:
    a memory storage device having instructions stored thereon, which, when executed by a processor, cause the system to:
    for each interaction by a member of an online service with a media content object associated with a content feed, store media content activity information referencing i) a member who has undertaken the interaction, ii) an interaction type, and iii) the media content object with which the member interacted, wherein the interaction type is one of: posting, viewing, playing, forwarding, liking, disliking, hiding, or reporting;
    process the media content activity information to identify a select number of media content objects associated with a number of interactions occurring over a recent period of time and exceeding some threshold;
    present the select number of media content objects via a graphical user interface to an administrator for review;
    for each media content object in some subset of the select number of media content objects, receive an indicator indicating the identified media content object is unprofessional, each indicator resulting from the administrator interacting with a graphical user interface via which the media content objects are presented; and
    for each media content object for which an indicator is received, propagate the indicator to a corresponding activity included in the media content activity information to indicate that activity is associated with a media content object deemed unprofessional.

2. The system of claim 1, wherein each interaction is associated with an activity level including a first activity level corresponding with a member having originally posted a media content object to the feed for the first time, and a second activity level corresponding with an interaction that is taken upon a media content object that has been originally posted by another member, and wherein said operation to store media content activity information includes storing media content activity information associated only with first and second level interactions, excluding any interactions associated with an activity level greater than the second activity level.

3. The system of claim 1, wherein the graphical user interface allows the administrator to filter and sort the select number of media content objects by interaction type and number of interactions, respectively.

4. The system of claim 1, wherein the instructions further cause the system to use a machine learning algorithm to train a machine to classify media content objects as unprofessional, wherein the training uses as training data information associated with the indicators resulting from the administrator interacting with the graphical user interface via which the media content objects are presented.

5. The system of claim 1, wherein the instructions further cause the system to:
    for some set of media content objects identified subsequent to the machine being trained to classify media content objects, submit the set of media content objects to the trained machine and receive an indicator for some subset of the media content objects that the machine classifies as unprofessional.

6. The system of claim 1, wherein the indicator indicates that the unprofessional media content object is one of obscene, humorous, spam, a puzzle, or an advertisement.

7. The system of claim 1, wherein the instructions further cause the system to remove the media content activity information at the online service that reference the unprofessional media content object.

8. A method comprising:
    for each interaction by a member of an online service with a media content object associated with a content feed, storing media content activity information referencing i) a member who has undertaken the interaction, ii) an interaction type, and iii) the media content object with which the member interacted, wherein the interaction type is one of: viewing, playing, forwarding, liking, disliking, hiding, or reporting;
    processing the media content activity information to identify a select number of media content objects associated with a number of interactions occurring over a recent period of time and exceeding some threshold;
    presenting the select number of media content objects via a graphical user interface to an administrator for review;
    for each media content object in some subset of the select number of media content objects, receiving an indicator indicating the media content object is unprofessional, each indicator resulting from the administrator interacting with a graphical user interface via which the media content objects are presented; and
    for each media content object for which an indicator is received, propagating the indicator to a corresponding activity included in the media content activity information to indicate that activity is associated with a media content object deemed unprofessional.

9. The method of claim 8, wherein each interaction is associated with an activity level including a first activity level corresponding with a member having originally posted a media content object to the feed for the first time, and a second activity level corresponding with an interaction that is taken upon a media content object that has been originally posted by another member, and wherein said operation to store media content activity information includes storing media content activity information associated only with first and second level interactions, excluding any interactions associated with an activity level greater than the second activity level.

10. The method of claim 8, wherein the graphical user interface allows the administrator to filter and sort the select number of media content objects by interaction type and number of interactions, respectively.

11. The method of claim 8, further comprising, using a machine learning algorithm, training a machine to classify media content objects as unprofessional, wherein the training uses as training data information associated with the indicators resulting from the administrator interacting with the graphical user interface.

12. The method of claim 8, further comprising:
for some set of media content objects identified subsequent to the machine being trained to classify media content objects, submitting the set of media content objects to the trained machine and receiving an indicator for some subset of the media content objects that the machine classifies as unprofessional.

13. The method of claim 8, wherein the indicator indicates that the unprofessional media content object is one of obscene, humorous, spam, a puzzle, or an advertisement.

14. The method of claim 8, further comprising removing media content activity information at the online service that reference the unprofessional media content object.

15. A memory storage device having instructions stored thereon, which, when executed by a processor, cause operations to be performed, the operations comprising:
for each interaction by a member of an online service with a media content object associated with a content feed, storing media content activity information referencing i) a member who has undertaken the interaction, ii) an interaction type, and iii) the media content object with which the member interacted, wherein the interaction type is one of: viewing, playing, forwarding, liking, disliking, hiding, or reporting;
processing the media content activity information to identify a select number of media content objects associated with a number of interactions occurring over a recent period of time and exceeding some threshold;
presenting the select number of media content objects via a graphical user interface to an administrator for review;
for each media content object in some subset of the select number of media content objects, receiving an indicator indicating the media content object is unprofessional, each indicator resulting from the administrator interacting with a graphical user interface via which the media content objects are presented; and
for each media content object for which an indicator is received, propagating the indicator to a corresponding activity included in the media content activity information to indicate that activity is associated with a media content object deemed unprofessional.

16. The memory storage device of claim 15, wherein each interaction is associated, with an activity level including a first activity level corresponding with a member having originally posted a media content object to the feed for the first time, and a second activity level corresponding with an interaction that is taken upon a media content object that has been originally posted by another member, and wherein said operation to store media content activity information includes storing media content activity information associated only with first and second level interactions, excluding any interactions associated with an activity level greater than the second activity level.

17. The memory storage device of claim 15, wherein the operations further comprise, using a machine learning algorithm, training a machine to classify media content objects as unprofessional, wherein the training uses as training data information associated with the indicators resulting from the administrator interacting with the graphical user interface.

18. The memory storage device of claim 17, wherein the operations further comprise:
for some set of media content objects identified subsequent to the machine being trained to classify media content objects, submitting the set of media content objects to the trained and receiving an indicator for some subset of the media content objects that the trained machine classifies as unprofessional.

19. The memory storage device of claim 15, wherein the indicator indicates that the unprofessional media content object is one of obscene, humorous, spam, a puzzle, or an advertisement.

20. The memory storage device of claim 15, wherein the operations further comprise removing media content activity information at the online service that reference the unprofessional media content object.

\* \* \* \* \*